US012619552B2

(12) United States Patent
Bruguera

(10) Patent No.: US 12,619,552 B2
(45) Date of Patent: May 5, 2026

(54) PROCESSING OF CRYPTOGRAPHIC HASH INSTRUCTION

(71) Applicant: Arm Limited, Cambridge (GB)

(72) Inventor: Javier Diaz Bruguera, Santiago de Compostela (ES)

(73) Assignee: Arm Limited, Cambridge (GB)

( * ) Notice: Subject to any disclaimer, the term of this patent is extended or adjusted under 35 U.S.C. 154(b) by 166 days.

(21) Appl. No.: 18/524,968

(22) Filed: Nov. 30, 2023

(65) Prior Publication Data

US 2025/0181517 A1 Jun. 5, 2025

(51) Int. Cl.
*G06F 12/1018* (2016.01)
*H04L 9/06* (2006.01)

(52) U.S. Cl.
CPC ........ *G06F 12/1018* (2013.01); *H04L 9/0643* (2013.01)

(58) Field of Classification Search
CPC ........................... G06F 12/1018; H04L 9/0643
See application file for complete search history.

(56) References Cited

U.S. PATENT DOCUMENTS

2014/0189368 A1* 7/2014 Wolrich .............. G06F 9/30145
713/190
2023/0124185 A1* 4/2023 Koteshwara .......... G06F 9/3851
712/200

FOREIGN PATENT DOCUMENTS

CN 1735013 B * 4/2012 ........... H04L 9/0643
WO 2013072657 A1 5/2013
WO WO-2017030600 A1 * 2/2017 ........... G06F 3/0007

* cited by examiner

*Primary Examiner* — Mohammed Waliullah
(74) *Attorney, Agent, or Firm* — NIXON & VANDERHYE P.C.

(57) ABSTRACT

An apparatus comprises instruction decoding circuitry to decode a cryptographic hash instruction specifying at least one working operand and an input operand; and processing circuitry to perform, in response to decoding of the cryptographic hash instruction, two or more iterations of a cryptographic hash function. Each iteration of the cryptographic hash function comprises determining an updated value for the at least one working operand based on a previous value for the at least one working operand and a respective portion of the input operand selected to be processed in that iteration. The updated value for the at least one working operand in one iteration becoming the previous value for the at least one working operand in a next iteration. In response to decoding of the cryptographic hash instruction, the processing circuitry performs at least two iterations of the cryptographic hash function per processing cycle.

20 Claims, 7 Drawing Sheets

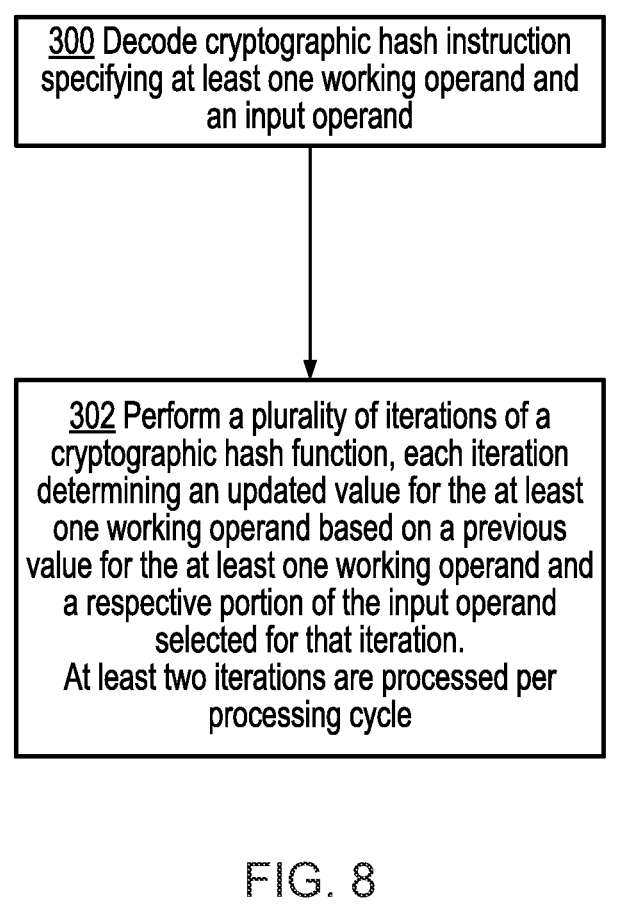

300 Decode cryptographic hash instruction specifying at least one working operand and an input operand 302 Perform a plurality of iterations of a cryptographic hash function, each iteration determining an updated value for the at least one working operand based on a previous value for the at least one working operand and a respective portion of the input operand selected for that iteration.
At least two iterations are processed per processing cycle

FIG. 8

PROCESSING OF CRYPTOGRAPHIC HASH INSTRUCTION

BACKGROUND

Technical Field

The present technique relates to the field of data processing.

Technical Background

Cryptographic hashes can be used to generate digests of messages, program code or other streams of binary data. For example, one use case can be where a stream of binary data (e.g. a program download) is transmitted to a recipient. The recipient can calculate a cryptographic hash based on the received stream of data, and compare the hash with an expected value of the hash, to determine whether any transmission errors or malicious attacks have affected the integrity of the received stream. The cryptographic hash may be designed to have a very low probability that a modified data stream received by the recipient would map to the same hash value as the actual data stream intended to be received by the recipient, when the modification corresponds to common errors such as replacing one symbol of the message with another symbol, swapping the order of the two symbols, omitting one symbol, etc. Various cryptographic hash algorithms are available, with different trade-off points between performance and security.

SUMMARY

At least some examples of the present technique provide an apparatus comprising:

instruction decoding circuitry to decode a cryptographic hash instruction specifying at least one working operand and an input operand; and processing circuitry to perform, in response to decoding of the cryptographic hash instruction, a plurality of iterations of a cryptographic hash function, each iteration of the cryptographic hash function comprising determining an updated value for the at least one working operand based on a previous value for the at least one working operand and a respective portion of the input operand selected to be processed in that iteration, the updated value for the at least one working operand in one iteration becoming the previous value for the at least one working operand in a next iteration; in which:

in response to decoding of the cryptographic hash instruction, the processing circuitry is configured to perform at least two iterations of the cryptographic hash function per processing cycle.

At least some examples provide a system comprising:

the apparatus as described above, implemented in at least one packaged chip;

at least one system component; and a board, wherein the at least one packaged chip and the at least one system component are assembled on the board.

At least some examples provide a chip-containing product comprising the system described above assembled on a further board with at least one other product component.

At least some examples of the present technique provide a non-transitory computer-readable medium to store computer-readable code for fabrication of an apparatus comprising:

instruction decoding circuitry to decode a cryptographic hash instruction specifying at least one working operand and an input operand; and processing circuitry to perform, in response to decoding of the cryptographic hash instruction, a plurality of iterations of a cryptographic hash function, each iteration of the cryptographic hash function comprising determining an updated value for the at least one working operand based on a previous value for the at least one working operand and a respective portion of the input operand selected to be processed in that iteration, the updated value for the at least one working operand in one iteration becoming the previous value for the at least one working operand in a next iteration; in which:

in response to decoding of the cryptographic hash instruction, the processing circuitry is configured to perform at least two iterations of the cryptographic hash function per processing cycle.

At least some examples of the present technique provide a method comprising:

decoding a cryptographic hash instruction specifying at least one working operand and an input operand; and performing, in response to decoding of the cryptographic hash instruction, a plurality of iterations of a cryptographic hash function, each iteration of the cryptographic hash function comprising determining an updated value for the at least one working operand based on a previous value for the at least one working operand and a respective portion of the input operand selected to be processed in that iteration, the updated value for the at least one working operand in one iteration becoming the previous value for the at least one working operand in a next iteration; in which:

in response to decoding of the cryptographic hash instruction, processing circuitry performs at least two iterations of the cryptographic hash function per processing cycle.

Further aspects, features and advantages of the present technique will be apparent from the following description of examples, which is to be read in conjunction with the accompanying drawings.

BRIEF DESCRIPTION OF THE DRAWINGS

FIG. 8 illustrates a method of processing a cryptographic hash instruction.

DESCRIPTION OF EXAMPLES

Figure 1:
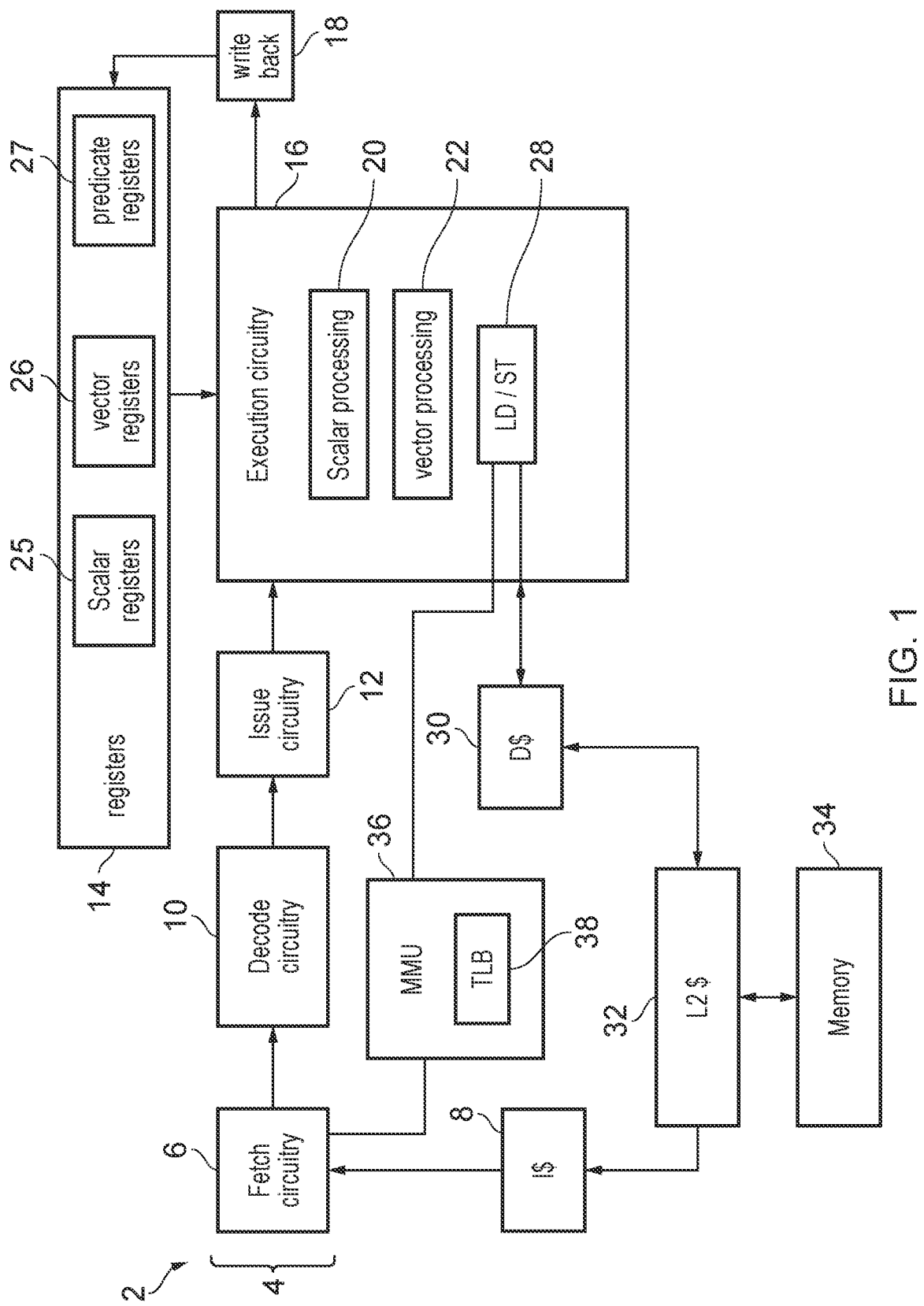
FIG. 1 illustrates an example of an apparatus comprising instruction decoding circuitry and processing circuitry.

Cryptographic hashes can be useful for generating message digests for verification of whether a received message or binary stream is correct or has been subject to input errors, transmission errors or tampering before being received by the recipient. Also, in some cases, even if there is no particular requirement for high security, cryptographic hashes may be used simply to derive a smaller value from a large amount of binary data which can be used as an identifier of the data (e.g. for identifying which of several software versions is in use, by generating the cryptographic hash of the corresponding software and comparing with expected values for each software version).

Hence, a wide variety of software workloads may include performing a cryptographic hash algorithm on some input data. Such cryptographic hashes typically rely on a maintaining a set of working data that is iteratively updated in each round of applying the cryptographic hash function, with the updated value for the working data depending on a portion of the message being hashed and the previous value of the working data input to that round. Each round of the cryptographic hash function may use a different portion of the message being hashed as the input to be combined with the working data to generate the updated value for the working data. The particular mathematical operations defining a particular cryptographic hash algorithm may be set out in a standard. However, there may be considerable design flexibility in how to implement cryptographic hash instructions for performing the cryptographic hash algorithm in an instruction set architecture, as well as how to provide processing circuitry in hardware that can execute the operations required by a given cryptographic hash instruction defined in an instruction set architecture.

Hence, an instruction set architecture supported by a processor may support a cryptographic hash instruction which implements at least part of a cryptographic hash algorithm involving multiple iterations (also known as rounds) of a cryptographic hash function. While it would be possible for an instruction set architecture to provide a single-iteration cryptographic hash instruction which corresponds to a single iteration (round) of the cryptographic hash function, so that each iteration of the cryptographic hash function requires execution of a separate instruction, in recent years processors are being supported with large registers (e.g. provided to support vector processing) so that it becomes feasible for a single instruction to take as inputs sufficient operand data that multiple iterations of the cryptographic hash function can be processed in response to a single instruction.

Hence, an apparatus may comprise instruction decoding circuitry to decode a cryptographic hash instruction specifying at least one working operand and an input operand, and processing circuitry to perform, in response to decoding of the cryptographic hash instruction, multiple (i.e. at least two) iterations of a cryptographic hash function. Each iteration of the cryptographic hash function comprises determining an updated value for the at least one working operand based on a previous value for the at least one working operand and a respective portion of the input operand selected to be processed in that iteration. The updated value for the at least one working operand in one iteration becomes the previous value for the at least one working operand in a next iteration.

The cryptographic hash instruction may be an instruction defined in an instruction set architecture and the at least one working operand and input operand may be obtained based on register specifiers specified by the cryptographic hash instruction. When in use for implementing cryptographic hash algorithms, it may be expected that the at least one working operand represents the working data for the cryptographic hash function while the input operand represents part of the message being hashed, although the actual usage of these operands may depend on the preceding instructions included by the software developer prior to the cryptographic hash instruction itself, so this is not enforced by any particular hardware logic circuitry provided in the apparatus itself.

Hence, a single instance of a cryptographic hash instruction may control the processing circuitry to perform multiple iterations of a cryptographic hash function. As each iteration updates the at least one working operand and the updated value is used as an input to the next iteration in the functional definition of the instruction set out in an instruction set architecture, the dependencies between iterations naturally lead one to assume that each iteration would need to have completed before performing the next iteration. Therefore, typical hardware implementations of such a cryptographic hash instruction would perform a single iteration of the cryptographic hash function per processing cycle. One would expect that attempting to perform more than one iteration of the cryptographic hash function in the same processing cycle would require too much sequential processing of the dependent iterations back-to-back, so that it would no longer be possible to fit all the required steps into a single cycle while meeting the timing requirements imposed on processor pipelines given the typical clock frequencies that modern processors operate at.

However, counter-intuitively, the inventor has recognised that, despite a later iteration of the cryptographic hash function being dependent on the result of the previous iteration, with careful design of the processing logic it is feasible to perform at least two iterations of the cryptographic hash function per processing cycle, while still meeting timing requirements. Hence, in the examples discussed below, in response to decoding of the cryptographic hash instruction, the processing circuitry performs at least two iterations of the cryptographic hash function per processing cycle. With this approach, processing performance for the cryptographic hash instruction can be greatly improved because the total number of cycles required to execute a given number of iterations of the cryptographic hash function can be reduced by a factor of at least two. This can provide a significant performance improvement for a processing workload as a whole, because typical cryptographic hashing algorithms may involve many rounds of applying the cryptographic hash function and therefore such a cryptographic hash instruction may be repeated many times in the software routine being executed to implement the overall hash algorithm, so performance gains in executing a single cryptographic hash instruction are multiplied for the software workload as a whole.

While other cryptographic hash functions are also possible, this technique can be particularly beneficial for accelerating processing of the SHA-1 (Secure Hash Algorithm 1) cryptographic hash algorithm. Although SHA-1 has been retired from use in the highest security applications due to attacks, it is still used in a lot of legacy code, in applications where legal or regulatory constraints mandate use of SHA-1 as the cryptographic hash algorithm, or in workloads where there is no particular security requirement and the SHA-1 algorithm is simply being used to generate a digest of a larger amount of data for purposes of being able to identify the data. Therefore, there is still a lot of software in use that uses SHA-1.

Hence, in some examples, the cryptographic hash function comprises at least a portion of one round of SHA-1. It can be particularly beneficial to apply the technique of executing at least two iterations per processing cycle to a cryptographic hash function based on SHA-1, because the particular algorithm of SHA-1 has features which are better able to support increased parallelization between parts of successive iterations of the cryptographic hash function than is possible with other hash algorithms, increasing the extent to which processing can be accelerated by implementing multiple iterations of the hash function in the same processing cycle, while still meeting circuit timing requirements.

In some examples, the processing circuitry performs two iterations of the cryptographic hash function per processing cycle. Hence, among the total number of iterations of the cryptographic hash function performed in response to the cryptographic hash instruction, the iterations include a first iteration and a second iteration to be performed in a same processing cycle.

The total number of iterations of the cryptographic hash function performed in response to one instance of the cryptographic hash instruction can be two or more, e.g. 2, 4, 8 or 16. The total number of iterations performed for a single instance of the cryptographic hash instruction need not be sufficient to cover all iterations required in the cryptographic hash algorithm as a whole. For example, the SHA-1 algorithm is based on 80 rounds of the cryptographic hash function, but in one particular example the cryptographic hash instruction may perform 4 iterations of the cryptographic hash function and the processing circuitry may, in response to that cryptographic hash instruction, process those 4 iterations with 2 iterations performed per cycle.

The processing circuitry may comprise unrolled multi-iteration logic circuitry disposed between two successive stages of clocked registers, where the unrolled multi-iteration logic circuitry is configured to process the at least one working operand read from a first of the successive sets of clocked registers as an input to a first iteration of the plurality of iterations to generate an updated value for the at least one working operand written to a second of the successive sets of clocked registers as an output of a later iteration than the first iteration. There may be no intervening set of clocked registers between the first and second of the successive sets of clocked registers. Hence, there is no need for the output of the first iteration to actually be written to a set of clocked registers. The output of the first iteration may simply be an intermediate value which may be generated at some point between the first and second sets of clocked registers, or alternatively the output of the first iteration may never be formally expressed as a particular set of a signals or numeric values. The combined function of the at least two iterations performed in the same cycle can be unrolled into a set of logic circuitry that generates the same result as if each iteration had been processed back-to-back with one iteration per cycle, but it is not essential for the output of each individual iteration to be available as a stored numeric value.

In some examples, the processing circuitry could be implemented as an iterative unit which comprises single-cycle processing logic circuitry implementing the at least two iterations of the cryptographic hash function that are to be performed in the same cycle. When the total number of iterations required in the cryptographic hash instruction is more than the number of iterations performed in one cycle, then the output of the single-cycle processing logic circuitry can be fed back as inputs to the single-cycle processing logic, to perform another pass through the single-cycle processing logic circuitry. This approach can require less circuit area overhead than in a pipelined example.

However, in other examples, the processing circuitry comprises a cryptographic hash instruction processing pipeline comprising a plurality of pipeline stages, each pipeline stage to perform at least two of the iterations of the cryptographic hash function per processing cycle. The output of an earlier pipeline stage may be fed as an input to a later pipeline stage, and processing of a subsequent instruction at the earlier pipeline stage can start before the previous instruction has reached the end of the pipeline yet. With this approach, a later pipeline stage can be processing a later subset of two or more of the iterations for an older cryptographic hash instruction in parallel with an earlier pipeline stage processing an earlier subset of two or more of the iterations for a younger cryptographic hash instruction, to improve performance by supporting overlapped parallel processing of multiple instructions.

Where, for the cryptographic hash instruction, a first iteration and a second iteration of the cryptographic hash function are performed in a same processing cycle, the processing circuitry may perform a first computation for the first iteration in parallel with a second computation for the second iteration. Hence, by parallelizing parts of the first and second iterations, the total time to perform both iterations can be shorter than if the second iteration was performed back-to-back after the first iteration has completed, so that performance can be improved and multiple iterations can fit within one processing cycle while meeting timing requirements.

Various parts of the cryptographic hash function can be parallelized as the first computation and the second computation. In some examples, there can be more than one opportunity for parallelization, so that there may multiple pairs of first/second computations for the first and second iterations that can be performed in parallel.

In one example, the cryptographic hash function comprises applying a given hashing function to a subset of bit positions of the previous value for the at least one working operand, to generate a term used to generate a portion of the updated value for the at least one working operand. The first computation can comprise applying the given hashing function to a first subset of bit positions of the first iteration's version of the previous value for the at least one working operand. The second computation can comprise applying the given hashing function to a second subset of bit positions of the first iteration's version of the previous value for the at least one working operand, where the second subset is different to the first subset. This can be particularly helpful for algorithms, such as SHA-1, for which the cryptographic hash function comprises mapping the second subset of bit positions of the previous value for the at least one working operand to the first subset of bit positions within the updated value for the at least one working operand. As the second subset of bit positions of the previous value for the at least one working operand is mapped unchanged to the first subset of bit positions in the updated value for the at least one working operand, this means it is possible to evaluate the given hashing function for the second iteration direct from the at least one working operand supplied as input to the first iteration (but with the second iteration using the second subset of bits instead of the first subset of bits that is used for the first iteration). As both instances of the given hashing function can therefore be evaluated from the input to the first iteration without dependency between them, this gives an opportunity for parallelizing the respective instances of the hashing function, that can be exploited to reduce the critical path delay across the at least two iterations and hence improve performance.

In some examples, the instruction decoder may support two or more variants of the cryptographic hash instruction corresponding to different hashing functions used as the given hashing function. The techniques discussed in this application can be applied to any of those variants. Multiple variants of the cryptographic hash instruction based on different versions of the given hashing function can be useful for cryptographic hash algorithms such as SHA-1, for which different subsets of rounds of the hashing function require different variants of the given hashing function applied to the input. Hence, the program code can execute the different variants of the cryptographic hash instruction in the order required by the SHA-1 algorithm. A single instance of the processing circuitry may support each variant of the cryptographic hash instruction (with alternative circuit paths selecting between different sub-units for the given hashing function depending on which variant of the cryptographic hash instruction is executed), or alternatively two or more separate instances of cryptographic hash processing units may be provided to handle each variant of the instruction.

Another opportunity for parallelism can be in determining a result of an addition of multiple terms used in the cryptographic hash function. In the cryptographic hash function, a portion of the updated value for the at least one working operand may depend on an addition of two or more terms, those terms including the respective portion of the input operand and one or more further terms derived from the previous value of the at least one working operand. In particular, such an addition may involve three, four or more terms, depending on the cryptographic hash function used. As additions are relatively slow operations in comparison to other functions, improving the performance for the addition steps may be significant in terms of the performance achieved for the instruction overall.

Hence, in some examples, it can be useful for the processing circuitry to perform a part of the addition for the first iteration in parallel with a part of the addition for the second iteration. For example, there may be a part of the addition for the second iteration which is based on terms that are independent of the result of the first iteration's addition (e.g. based on the input operand, bits that can be derived direct from the first iteration's version of the previous value for the at least one working operand, and/or a result of the given hashing function mentioned above). The part of the second iteration's addition that is independent of the result of the first iteration's addition can therefore be performed in parallel with the first iteration's addition. There may be a further part of the addition for the second iteration which does depend on the result of the first iteration's addition, so the addition operations for the first and second iteration may not be able to be performed fully in parallel. Nevertheless, by overlapping the first iteration's addition and the second iteration's addition in timing so that a part of the addition for the second iteration occurs in parallel with a part of the addition for the first iteration, the overall delay through both iterations can be reduced to improve performance.

In some cryptographic hash functions (including SHA-1), the terms added in the addition comprise a rotated term which depends on a rotated version of bits from a selected subset of bit positions within the previous value for the at least one working operand. The selected subset of bit positions may correspond to bit positions in the updated value for the at least one working operand which depend on a result of the addition of the plurality of terms. For such a cryptographic hash function, parallelizing parts of the additions for the first and second iterations can be particularly challenging while meeting circuit timings, because the rotated term to be included in the second iteration's addition will depend on the result of the addition in the first iteration, so on the face of it this means the rotated term cannot be added until the first iteration's addition is available, limiting the opportunity for parallelism.

However, the inventor recognised that, actually, processing performance can be made faster by providing the processing circuitry with second-iteration addition circuitry to perform a rotated-term-dependent part of the addition for the second iteration based on at least two separate values representing, in a redundant representation, at least a portion of the rotated term for the addition for the second iteration. The second-iteration addition circuitry may commence performing the rotated-term-dependent part of the addition based on the at least two separate values before a non-redundant representation of the result for the addition for the first iteration is available. Hence, by processing the rotated term at least partly in a redundant representation, the part of the second iteration's addition that depends on the rotated term can start before the non-redundant representation of the result of the first iteration's addition is available, eliminating the delay associated with generation of a non-redundant representation representing the result of the first iteration's addition (which can be slow as it may involve a carry-propagate addition). Therefore, processing performance for the cryptographic hash instruction can be improved.

However, one issue with processing the rotated term in a redundant form can be that the redundant representation of the rotated term using at least two separate values may not account for a carry out which might be generated when those separate redundant values are added together to form a non-redundant representation. To account for such carries, the processing circuitry may comprise carry adjustment circuitry to adjust a result of the addition for the second iteration dependent on whether generation of the non-redundant representation of the addition for the first iteration causes a carry out to propagate beyond a bit position corresponding to a most significant bit in the rotated term used for the addition in the second iteration. By providing such carry adjustment circuitry, this enables the circuit designer to design the circuit logic so that the addition based on the rotated term for the second iteration starts at an earlier point in the cycle, to improve performance.

However, when considering the carries in the rotated term, one particular problem is that if the calculation of the non-redundant result of the first iteration's addition generates a carry out at a most significant portion of the non-redundant result, when a left rotation is applied to form the rotated term in the second iteration's addition this may affect bits at a least significant portion of the values being added in the second iteration's addition. This can create a challenge for meeting circuit timings because in the second iteration's addition, a final carry-propagate addition to generate the result of the second iteration's addition in a non-redundant form may require the least significant bit values to be known before being able to ripple through additions to generate more significant bits.

This problem can be addressed by providing the processing circuitry with early carry-propagate addition circuitry to generate, in a non-redundant representation, a plurality of most significant bits for a result of the addition for the first iteration, the early carry-propagate addition circuitry being configured to generate the plurality of most significant bits at an earlier timing than a timing at which a non-redundant representation of remaining less significant bits of the result of the addition for the first iteration is generated. In the rotated-term-dependent part of the addition for the second iteration, a least significant portion of the rotated term is represented in the non-redundant representation based on the most significant bits generated by the early carry-propagate addition circuitry. Hence, with this approach the second iteration's addition processes the rotated term partly in non-redundant representation (the least significant portion of the second iteration's addition being based on the value generated by the early carry-propagate addition circuitry for the most significant bits of the first iteration's addition result) and partly in redundant representation (with the remaining more significant bits being derived from a redundant form of the result of the first iteration's addition to reduce timing delays). This means that the carry adjustment can be less impactful on timings because a non-redundant result is already available for the lower bits being added in the second iteration's addition. Nevertheless, carry adjustment circuitry can be provided to selectively adjust a portion of the result of the addition for the second iteration depending on a carry out value determined when generating the non-redundant representation of the remaining less significant bits of the result of the addition for the first iteration. With this approach, the overall critical path delay through the first and second iterations as a whole can be reduced to improve performance and make it more feasible to meet circuit timings.

Some specific examples are now set out with reference to the drawings.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline arrangement, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar processing unit 20 (e.g. comprising a scalar arithmetic/logic unit (ALU) 20 for performing arithmetic or logical operations on scalar operands read from the registers 14); a vector processing unit 22 for performing vector operations on vectors comprising multiple data elements; and a load/store unit 28 for performing load/store operations to access data in a memory system 8, 30, 32, 34. Other examples of processing units which could be provided at the execute stage could include a floating-point unit for performing operations involving values represented in floating-point format, or a branch unit for processing branch instructions.

The registers 14 include scalar registers 25 for storing scalar values, vector registers 26 for storing vector values, and predicate registers 27 for storing predicate values. The predicate values 27 may be used by the vector processing unit 22 when processing vector instructions, with a predicate value in a given predicate register indicating which data elements of a corresponding vector operand stored in the vector registers 26 are active data elements or inactive data elements (where operations corresponding to inactive data elements may be suppressed or may not affect a result value generated by the vector processing unit 22 in response to a vector instruction).

A memory management unit (MMU) 36 controls address translations between virtual addresses (specified by instruction fetches from the fetch circuitry 6 or load/store requests from the load/store unit 28) and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline arrangement, and the processor may include many other elements not illustrated for conciseness.

Figure 2:
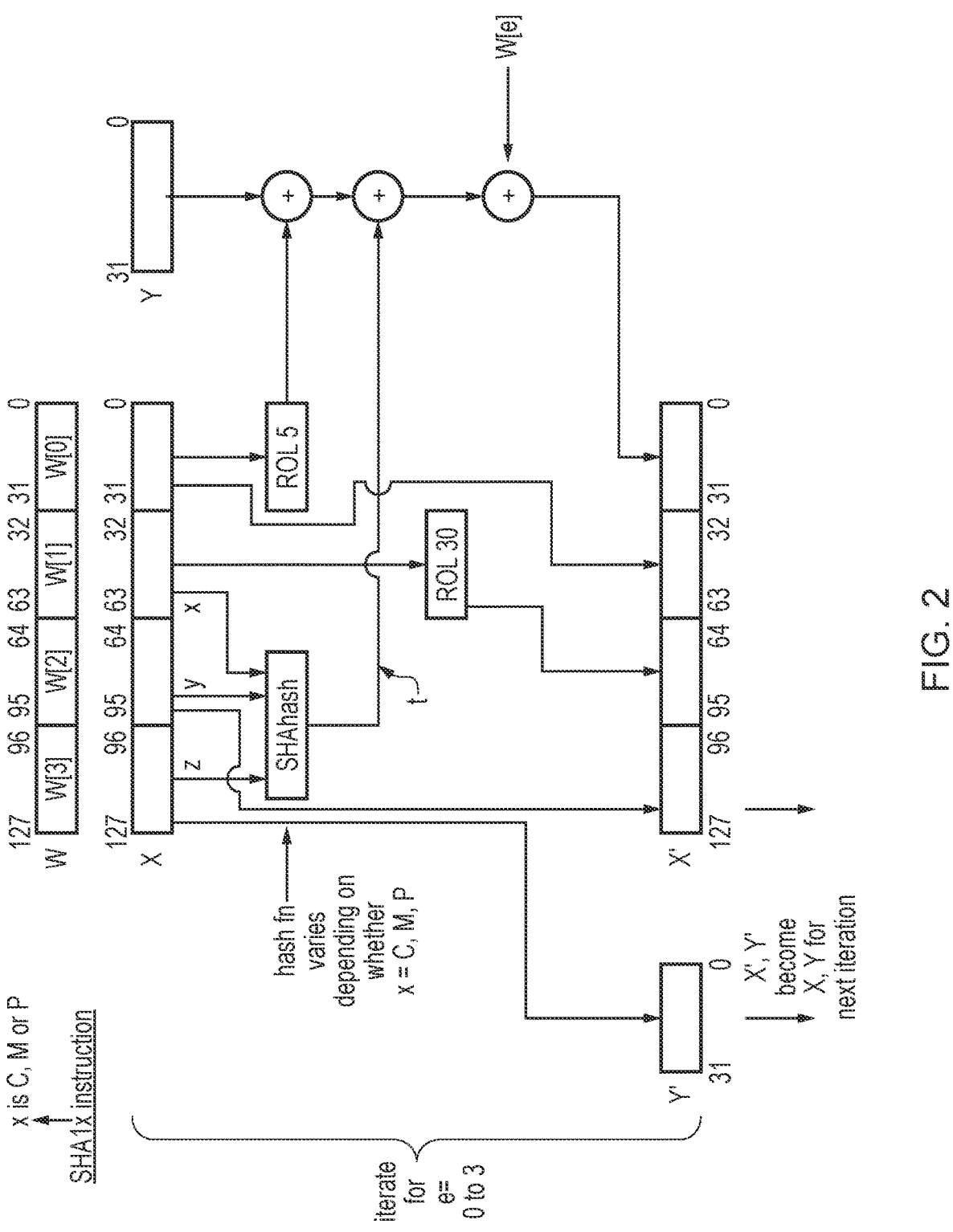
FIG. 2 illustrates an example of a cryptographic hash function.

One type of instruction supported by the processor may be a cryptographic hash instruction for implementing a cryptographic hash function corresponding to at least a portion of a round of a cryptographic hash algorithm. FIG. 2 shows an example of such an instruction, where the cryptographic hash algorithm is SHA-1 (Secure Hash Algorithm 1) and the cryptographic hash instruction is one of the SHA1C, SHA1M or SHA1P instructions supported by the Arm® instruction set architecture (ISA). While the subsequent examples discuss these particular instructions, it will be appreciated that similar techniques could be applied to other cryptographic hash instructions. The SHA1C, SHA1M and SHA1P instructions will collectively be referenced as a SHA1 instruction, when describing features common to all these instructions.

The SHA-1 algorithm is based on applying 80 rounds of a cryptographic hash function to 160 bits of working data. In each round, the previous value of the working data is processed in combination with a round constant specific to that round and a next 32-bit portion of the input message being hashed (each round taking a different portion of the input message), to generate an updated value of the working data which becomes the previous value of the working data in the following round. The final value of the 160-bit working data after the last round can either be used as a digest of the message in its own right, or can be added to a previous 160-bit digest value from previous instances of running the SHA-1 algorithm (e.g. if the input message requires more than 80 32-bit portions, then multiple instances of the SHA-1 algorithm may be applied to each 80*32-bit portion of the message and the digests from each instance added together to form the overall digest for the message).

FIG. 2 illustrates functionality of the SHA1 instruction, which when decoded by the instruction decoding circuitry 10 controls the processing circuitry (e.g. vector processing unit 22) to perform a 4-iteration loop. The architectural definition of the instruction is as follows:

```
bits(128) X = V[d];      //represents 128 bits of the 160-bit working data
bits(32)  Y = V[n]; //Note: 32 not 128 - the remaining 32 bits of 160-bit
working data
bits(128) W = V[m];      4*32-bit portions of the input message being
hashed
bits(32) t;      // internal variable representing the result of hasing
part of the working data
for e = 0 to 3
        t = SHA_choose     (X < 63 : 32 >, X < 95 : 64 >, X < 127 : 96 >);
        // SHA1C
        t = SHA_majority(X < 63 : 32 >, X < 95 : 64 >, X < 127 : 96 >);
        // SHA1M
        t = SHA_priority    (X < 63 : 32 >, X < 95 : 64 >, X < 127 : 96
>);
        // SHA1P
        Y < 31 : 0 >= Y + ROL(X < 31 : 0 >, 5) + t + Elem[W, e, 32];
        X < 63 : 32 >= ROL(X < 63 : 32 >, 30);
        < Y, X >= ROL(Y > 31 : 0 >: X < 127 : 0 >, 32);
        V[d] = X;
        where:
SHA_choose(x, y, z)   =   ((y _EOR z) AND x) EOR z
SHA_majority(x, y, z)   =   _(x AND y) OR ((x OR y) AND z)
SHA_parity(x, y, z)   =   x EOR y EOR z
Elem[W, e, 32] selects the eth 32-bit element of W, i.e. selecting
W < 31:0> when
e=0; W<63:32> when e=1; W<95:64> when e=2; and W<127:96;
when e=3
(ROL(x,y) is left-rotate x by bits, EOR is exclusive OR).
```

Note that the SHA_choose, SHA_majority and SHA_parity hashing functions are alternatives—any given instance of the SHA1 instruction only performs one of these hashing functions, depending on which of the SHA1C (SHA-_choose), SHA1M (SHA_majority) or SHA1P (SHA_parity) is executed. The different variants of the SHA1 instruction help support the feature of the SHA-1 algorithm where different subsets of rounds in the 80-round SHA-1 algorithm use different hash functions for calculating the "t" term.

The SHA1 instruction implements 4 iterations of a cryptographic hash function which corresponds to a portion of one round of the SHA-1 algorithm. It is not essential for all functions of one round of the SHA-1 algorithm to be implemented using this instruction—some parts of the SHA-1 round can be performed separately in response to a different instruction. For example, in the SHA-1 algorithm itself, the addition equivalent to the calculation of the $Y<31:0>$ term shown above also requires addition of a further round constant, which is not implemented in the addition for $Y<31:0>$ performed in response to the SHA1 instruction. This feature of the instruction set architecture design is to simplify the hardware circuit logic for implementing the SHA1 instruction, which can add fewer terms and so meeting timing requirements is simpler. When the SHA1 instruction is used in a section of program code for implementing the SHA-1 algorithm, an earlier vector add instruction (or set of add instructions) may pre-process the input message by adding the relevant round constants to each portion of the input message, so that when the SHA1 instruction is executed, the W operand has already had the round constants added into the input message, so that it is not necessary for the SHA1 instruction to consider the round constant addition.

The SHA1 instruction exploits the relatively wide input registers and mechanisms for reading parts of registers that are supported for vector processing using the vector registers 26 and vector processing circuitry 22. Hence, the SHA1 instruction takes as input operands 160 bits of working data spread across two source vector registers Vd, Vn (corresponding to variables X and Y as described below), and writes its result to a destination vector register Vd. In this example, the destination register is the same register used for the X source operand, although other ISAs could choose a non-destructive encoding with a separate destination register. In this example, the 160-bit working register is specified with 128 bits in the first vector source operand X and 32 bits in the second source operand Y, which although small enough to fit in a scalar operand may be specified as a second vector source operand, as typically in many hardware implementations the scalar register file may be a relatively long distance away on the chip from the vector processing unit 22, so it may be more efficient in terms of performance if the Y operand can also be specified in a vector register. While the SHA1 instruction provided by Arm® splits its 160-bit working data with 128 bits in a first working operand and 32 bits in a second working operand, other ISAs implementing a similar instruction could divide the working data among a set of working operands in a different manner (e.g. between three working operands with 64, 64 and 32 bits in the respective operands, or defining the working data as a single operand using 160 bits of a 256-bit vector register). Hence, the particular allocation of bits of working data to each input operand can vary, and in general at least one working operand is provided.

As shown in FIG. 2, in response to decoding of the SHA1 instruction (SHA1x, where x is one of C, M or P) by the instruction decoding circuitry 10, the vector processing unit 22 performs 4 iterations of the cryptographic hash function, each iteration generating updated values for the working operands X', Y' based on the previous values of the working operands X, Y and a respective portion W[e] selected from the input operand W (e=0 to 3 for the 4 respective iterations). The updated values X', Y' from one iteration become the previous values X, Y for the following iteration. In each iteration, the 128 bits of the previous value for X are shifted up in position to become Y' <31:0> and X'<127:32> of the updated values for the working operands, with X<63:32> having been left-rotated by 30 bits to form X'<95:64>. On the other hand, the lower 32 bits of the updated value X'<31:0> are set based on the addition of multiple terms shown above: Y<31:0>=Y+ROL(X<31:0>, 5)+t+Elem[W, e, 32]. Hence, a given hashing function SHAhash(x, y, z) is applied to portions x, y, z of the previous value of the X operand (where x is X<63:32>, y is X<95:64> and z is X<127:96>, and SHAhash is SHA_choose if the instruction is SHA1C, SHA_majority if the instruction is SHA1M and SHA_parity if the instruction is SHA1P), to generate a hash result t which is added to a 5-bit left-rotated version of X<31:0> and to the selected element W[e] of the input operand, to form an addition result provided as the lower 32 bits of X'<31:0>.

Figure 3:
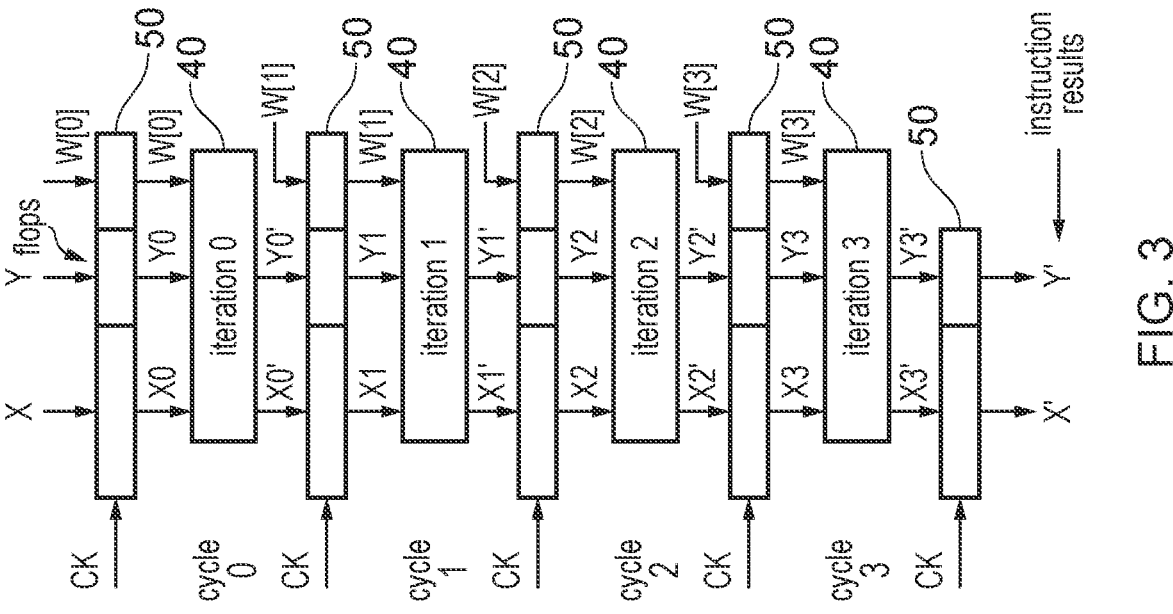
FIG. 3 illustrates, for comparison, an example of processing a single iteration of the cryptographic hash function per processing cycle.

The iterative nature of the SHA1 instruction, and the apparent dependency of the input X of one iteration on the output X' of the previous iteration, which depends on a relatively slow addition operation to calculate X'<31:0>, has meant that typically, one would assume that the processing circuitry 22 should process one iteration per processing cycle, e.g. using a 4-stage pipeline as shown in FIG. 3. Each pipeline stage 40 is bounded by a pair of successive stages of clocked registers 50 (e.g. flip-flops), with a clock signal CK controlling the timing at which an output of one stage written to the output stage of registers 50 for that stage is captured to become the input for the following stage. Hence, in cycle 0 the original values for the X, Y working operands are processed in iteration 0 together with the first element of the input operand, W[0], to produce updated values X0', Y0' for the working data, which are captured in a set of registers and at the start of cycle 1 becomes the previous values X1, Y1 for iteration 1. Similarly, cycles 1, 2 and 3 process iterations 1, 2 and 3 respectively, in each case to generate updated working data values Xe', Ye' from previous working data values Xe, Ye and W[e]. By the end of cycle 3, the end result X', Y' of the 4-iteration instruction is available. Each pipeline stage comprises the circuit logic for performing a single iteration according to the functionality shown in FIG. 2. However, this requires 4 cycles per instruction. Although pipelining can be used to reduce the effective number of cycles per additional instruction when there are enough instructions to fill the pipeline (e.g. by starting a second instruction in cycle 0 when the previous instruction has moved onto cycle 1), often there may not be enough SHA1 instructions to fill the pipeline fully, so that the 4 cycles taken to execute a given instruction can harm performance.

Figure 4:
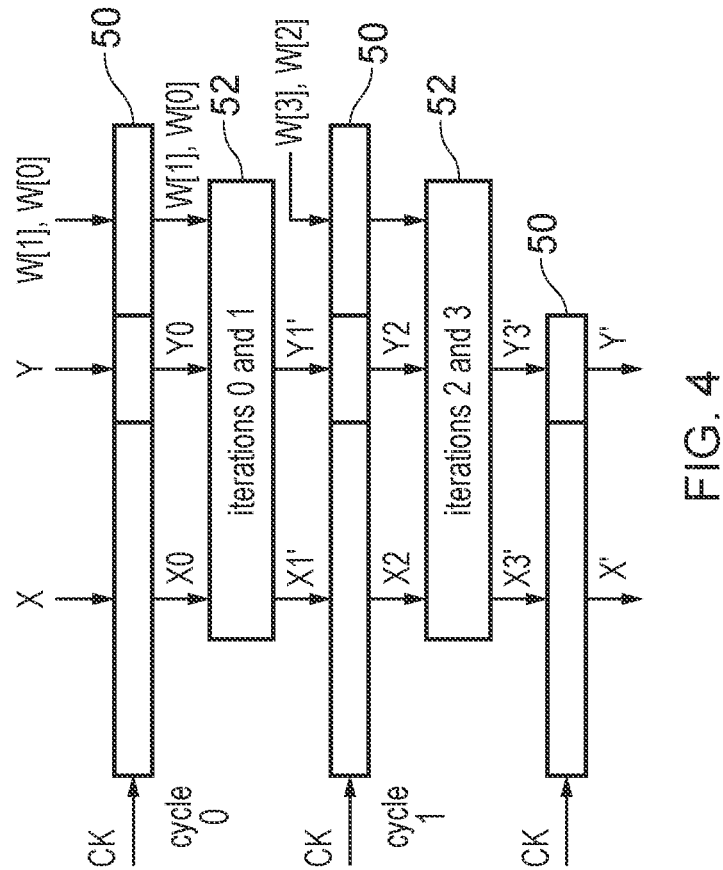
FIG. 4 illustrates an example of processing multiple iterations of the cryptographic hash function per processing cycle.

As shown in FIG. 4, the inventor has recognised that, surprisingly, despite the dependency between iterations, it is possible to execute more than one iteration of the cryptographic hash function per processing cycle, so that the total number of cycles taken to execute the instruction can be reduced. FIG. 4 shows a similar pipeline to FIG. 3, with each pipeline stage taking the previous values for X, Y from an input stage of clocked registers 50 and writing the stage's updated values for X', Y' to an output stage of clocked registers 50. However, in this example each pipeline stage comprises unrolled multi-iteration logic circuitry 52 comprising hardware circuitry to implement the logic for performing two successive iterations of the cryptographic hash function. Hence, with a 4-iteration SHA1 instruction, the instruction can be processed in 2 cycles: cycle 0 performing iterations 0 and 1, and cycle 1 performing iterations 2 and 3. In cycle 0, the previous value of the working operands X0, Y0 and the respective elements W[0], W[1] from the input operand are processed to generate updated working operand values X1', Y1' corresponding to the output of iteration 1. The updated working operand values X1', Y1' from iteration 1 become the previous value of the working operands X2, Y2 for iteration 2. Hence, in cycle 1, the previous value of the working operands X2, Y2 for iteration 2 is processed together with elements W[2], W[3] from the input operand, to generate updated working operand values X3', Y3' corresponding to the output of iteration 3. There is no need for the outputs of the internal iterations 0 and 2 (X0', Y0' or X2', Y2' as shown in FIG. 3) to be calculated as a standalone value, as the unrolling of multiple iterations into a single cycle means that only the final output of the last of the unrolled iterations is captured in the output stage 50 of clocked registers.

It will be appreciated that if an alternative ISA defines a SHA1 instruction with more than 4 iterations, then additional pipeline stages can be provided. Also, while FIG. 4 shows a pipelined unit having two separate instances of the unrolled logic circuit hardware 52, one in the first pipeline stage and another in the second pipeline stage, other examples could implement the SHA1 instruction using an iterative unit where a single stage of the unrolled multi-iteration logic circuitry 52 is provided to perform a certain number of iterations per cycle, with the outputs of the iterative unit being fed back as the inputs to a subsequent pass through the circuitry 52, with multiple passes through the same unit being required to produce the overall SHA1 instruction result.

Regardless of whether the processing circuitry 22 for implementing the SHA1 instruction comprises a pipeline as in FIG. 4 or an iterative unit, the unrolling of multiple iterations into one processing cycle using unrolled multi-iteration logic circuitry 52 is advantageous because it allows parts of the computations required for two successive iterations i, i+1 to be at least partially parallelized to improve performance. This way the latency can be reduced to only 2 cycles, although careful design of the logic circuitry 52 can be applied to ensure that the two-iteration function can be performed within the timing constraints required by typical clock frequencies used in modern processors.

In particular, note that in the function shown in FIG. 2, X<31:0> is not used in the calculation of t, the result of the hashing function SHAhash. This provides an opportunity for parallelization when unrolling multiple iterations into one cycle, because it means that the portions of X involved in calculating t do not depend on the portion of X' which depends on the addition result Y+ROL(X<31:0>, 5)+t+Elem [W, e, 32] for the previous iteration. Therefore, the unrolled logic circuitry 52 can calculate the hash results for the two iterations in parallel, based on different selected subsets of bits of the input operand X for the first of the two iterations.

Also, while the addition result for the second of the two unrolled iterations Y+ROL(X<31:0>, 5)+t+Elem[W, e, 32] includes a rotated term ROL(X<31:0>, 5) which depends on the portion of X which will depend on the addition for the first of the two unrolled iterations, the other terms in the addition Y, t and Elem[W, e, 32] are all independent of the addition for the first iteration, so the parts of the second iteration's addition that are based on terms independent of the first iteration's addition can be performed in parallel with parts of the first iteration's addition, to speed up performance.

As an example, and without loss of generality, we can show the unrolling of two successive iterations e=0 and e=1 (the same logic clearly also applies to the later two successive iterations e=2 and e=3).

e=0

$$t_0 = SHAhash(X<63:32>, X<95:64>, X<127:96>)$$

$$r_0 = ROL(X<31:0>, 5) = \{X<26:0>, X<31:27>\}$$

$$Y_{t0}<31:0> = Y<31:0> + \{X<26:0>, X<31:27>\} + t_0 + W<31:0>$$

$$X<63:32> = ROL(X<63:32>, 30) = \{X<33:32>, X<63:34>\}$$

$$<Y_0, X_0> = ROL(Y_{t0}<31:0> : X<127:0>, 32) = \{X<127:96>,$$

$$X<95:64>, \{X<33:32>, X<63:34>\}, X<31:0>, Y_{t0}<31:0>\}$$

Then, the output of iteration 0 is:

$$Y_0'<31:0> = X<127:96>$$

$$X_0'<127:0> = X<95:64>,$$

$$\{X<33:32>, X<63:35>\}, X<31:0>, Y_{t0}<31:0>$$

e=1 For this second iteration, in some places $X_0<31:0>$ and $Y_0<31:0>$ will be replaced with their values output from iteration 0 as above, to show how the steps can be reorganized.

$$t_1 = SHAhash(X_0'<63:32>, X_0'<95:64>, X_0'<127:96>) =$$

$$SHAhash(X<31:0>, \{X<33:32>, X<63:34>\}, X<95:64>) =$$

$$r_1 = ROL(X_0'<31:0>, 5) = ROL(Y_{t0}, 5)$$

$$Y_{t1}<31:0> = Y_0<31:0> + ROL(Y_{t0}, 5) + t_1 + W$$

$$<63:32> = X<127:96> + ROL(Y_{t0}, 5) + t_1 + W<63:32>$$

$$X_{0rot}<63:32> = ROL(X_0<63:32>, 30) =$$

$$ROL(X<31:0>, 30) = \{X<1:0>, X<31:2>\}$$

$$X_{0rot}<127:0> = \{X<95:64>,$$

$$\{X<33:32>, X<63:34>\}, \{X<1:0>, X<31:2>\}, Y_{t0}<31:0>\}$$

$$<Y_1', X_1'> = ROL(\{Y_{t1}<31:0> : X_{0rot}<127:0>\}, 32) = X<95:64>,$$

$$\{X<33:32>, X<63:34>\},$$

$$\{X<1:0>, X<31:2>\}, Y_{t0}<31:0>, Y_{t1}<31:0>$$

Figure 5:
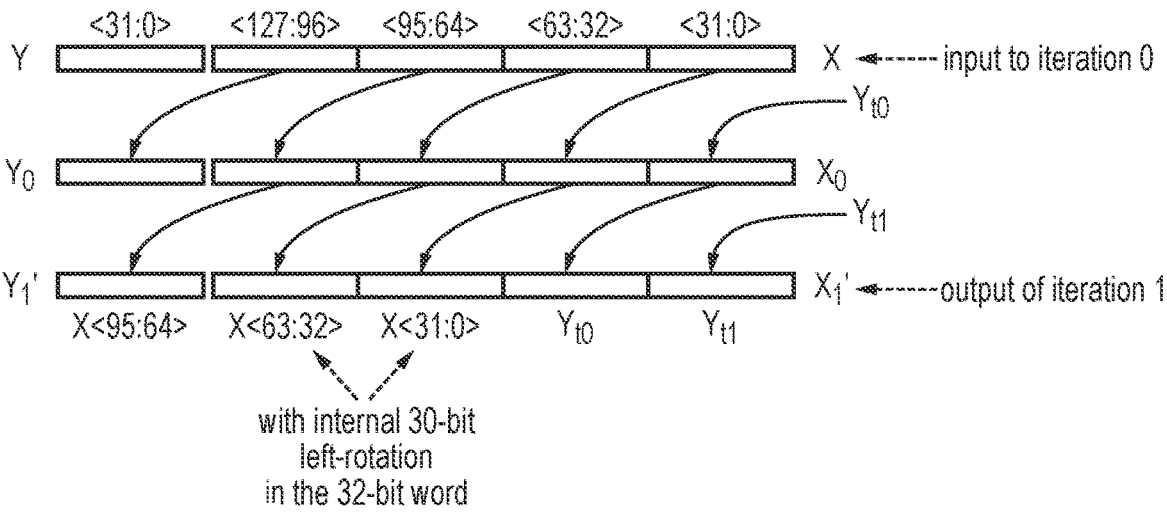
FIG. 5 illustrates unrolling of two successive iterations of the cryptographic hash function, to indicate how an output of a second iteration can be derived from an input to a first iteration.

Hence, as shown in FIG. 5, the outcome of unrolling two successive SHA1 iterations into combined logic is:

mapping X<95:64> direct to $Y_1'<31:0>$ mapping X<63:32> and X<31:0> to $X_1'<127:96>$ and $X_1'<95:64>$ respectively after having applied an internal 30-bit left-rotation in each 32-bit word.

setting $X_1'<63:32>$ based on the addition result $Y_{t0}$ for the first of the unrolled pair of iterations; and setting $X_1'<31:0>$ based on the addition result $Y_{t1}$ for the second of the unrolled pair of iterations.

The inventor notes that:

1. $t_0$ and $t_1$ (the results of SHAhash for the respective iterations) can be computed in parallel because they depend only on X<127:0>, the input to the first iteration).

2. the Y output, $Y_1'<31:0>$, and the upper part of the X output, $X_1'<127:64>$, depend only on part of the input to loop iteration 0, X<95:0>, and can be obtained without any arithmetic (either being mapped directly to the output, or generated by selecting the appropriate bits to reflect the 30-bit left rotation).

Hence, the main difficulty is the calculation of the lower part of the X output:

$$Y_{t0}<31:0> = Y<31:0> + \{X<26:0>, X<31:24>\} + t_0 + W<31:0>$$

$$Y_{t1}<31:0> = Y_0<31:0> + ROL(Y_{t0}, 5) + t_1 + W<63:32>$$

Term $Y_{t0}$ can be computed with a 4-to-2 reduction and a 32-bit addition.

On the other hand, for a fast calculation of $Y_{t1}$ a redundant carry-save form of $Y_{t0}$ is used; this way, $Y_{t1}$ can be obtained with 5-to-2 reduction and a 32-bit adder. In addition, to reduce the total number of logic levels in the $Y_{t1}$ reduction tree, part of the 5-to-2 reduction can be done in parallel with the $Y_{t0}$ 4-to-2 reduction. That is, the 3-to-2 reduction of (X<127:96>, $t_1$, W<63:32>) is independent of $Y_{t0}$ and so can be performed in parallel with the $Y_{t0}$ 4-to-2 reduction. This way, the $Y_{t1}$ reduction tree has only four 3-to-2 CSA levels.

However, the $Y_{t1}$ calculation relies on a rotated term ROL($Y_{t0}$, 5) which comprises the left-rotation of a redundant (carry-save) representation of Yt0, and it is affected by the carries produced in the calculation of Yt0 in non-redundant representation. This presents a challenge for fast calculation of $Y_{t1}$ An approach for accelerating $Y_{t1}$ addition by careful handling of the left-rotated carry-save representation of $Y_{t0}$ is now described.

Figure 6A:
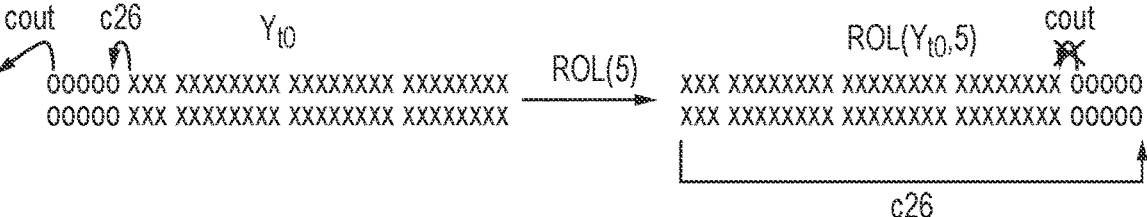
FIG. 6A illustrates handling of carries when processing a rotated term in an addition for a second iteration while represented in a redundant carry-save format.

Note that one of the addends in the calculation of $Y_{t1}$ is ROL(Yt0, 5), and the left-rotation of the redundant $Y_{t0}$ is affected by the carries produced in the calculation $Y_{t0}$. As shown in FIG. 6A, the final calculation of $Y_{t0}$ can produce a carry out (cout) at the most-significant position, and a carry out (c26) out of position $Y_{t0}<26>$. The carry out of position 26 should be used to increment the rotated redundant Yt0; on the other hand, the cout propagation in the rotated Yt0 should be broken.

For timing reasons, the increment due to c26 (the carry out of position 26) is put off until the very bottom of the pipeline stage; carry c26 is obtained in the final $Y_{t0}$ 32-bit adder and it is used as carry input in the final $Y_{t1}$ 32-bit adder. Breaking the cout propagation is more critical to timing because, although this carry can be obtained in $Y_{t0}$ 32-bit adder as well, it is used much earlier in the pipeline stage.

Figure 6B:
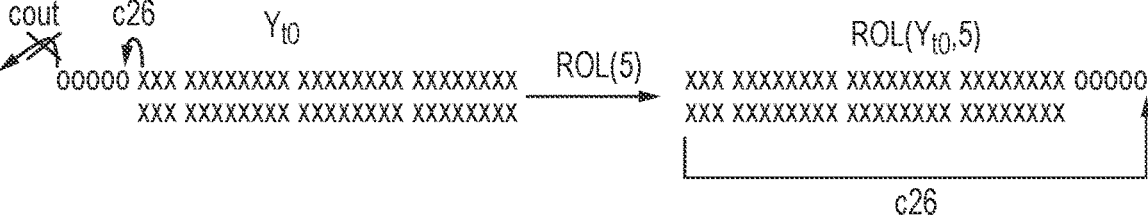
FIG. 6B illustrates how early computation of a non-redundant value for the most significant bits of the result of the addition for the first iteration can simplify handling of the rotated term in the addition for the second iteration.

Therefore, as shown in FIG. 6B, an estimation of the carry is obtained by assimilating the 5 most-significant bits of $Y_{t0}$ with an early 5-bit carry-propagate adder, to generate the upper 5 bits of $Y_{t0}$ in a non-redundant representation before the left-rotated version of $Y_{t0}$ is added in the addition for forming $Y_{t1}$. In FIG. 6B, the o's represent the non-redundant bits calculated by the early carry-propagate adder for the upper 5 bits of $Y_{t0}$, while the x's represent bits for representing the remaining bits of $Y_{t0}$ in a redundant representation such as carry-save representation (other redundant representations could also be used). Hence, the values added in the $Y_{t1}$ adders are partially in non-redundant representation (ooooo for the lower 5 bits of the 5-bit rotated value corresponding to the upper 5 bits of $Y_{t0}$) and partially in redundant representation (xxxx . . . for the remaining 27 more significant bits of the rotated value corresponding to the lower 27 bits of $Y_{r0}$). With this approach, the breaking of the cout carry can be achieved (as no carry out is passed beyond the lower 5 bits to the upper 27 bits of the Yt1 result) even though cout cannot fully be known until c26 is calculated.

However, we still consider a possible propagation of c26 to cout which could arise when the redundant terms of $Y_{r0}$ are added by a carry-propagation addition, which is not detected with 5-bit assimilation of the most-significant part of Yt0. This propagation happens only when (sum $Y_{r0}$<31: 27>) XOR (carry $Y_{r0}$<31:27>)=11111, where sum $Y_{r0}$ and carry $Y_{r0}$ are the redundant sum/carry terms representing $Y_{r0}$. If the XOR of the upper bits of the redundant terms for Yt0 (upper 5 bits of the two terms shown in FIG. 6A) is 11111, then this would mean that if c26 was set, it would cause a carry out to be generated as cout because the carry into position 27 would ripple all the way up to the cout position. If that is the case, the 5 most-significant bits of the non-redundant version of $Y_{r0}$<31:27> become 00000. Therefore, some carry adjustment circuitry is provided to detect whether the non-redundant version for the upper 5 bits of $Y_{r0}$ are all 1, and if this is the case and c26=1, then a multiplexer selects, as an alternative input to the $Y_{r1}$ addition, 0b00000 for the lower 5 bits input to the $Y_{r1}$ addition (instead of the actual result of the early 5-bit addition).

Figure 7:
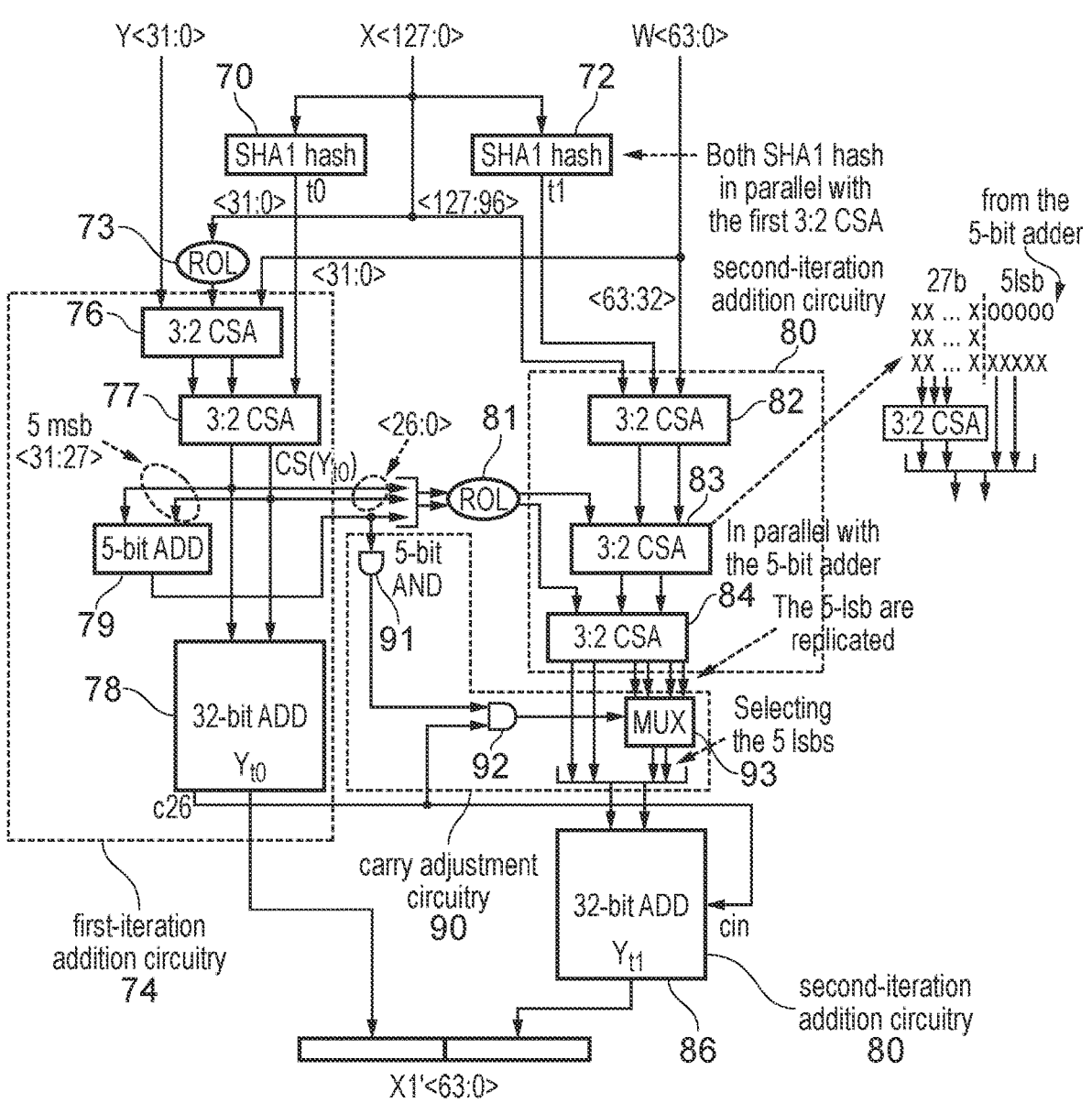
FIG. 7 illustrates circuitry for performing both a first iteration and a second iteration of the cryptographic hash function in a single processing cycle.

Hence, FIG. 7 shows a portion of the unrolled multi-iteration logic circuitry 52 for generating the lower 64 bits X1<63:0> of the output of the second of the pair of unrolled iterations, which represents the updated value of the working operand(s) from the second iteration, and is calculated based on the inputs Y<31:0>, X<127:0>, W<63:0> for the first of the pair of unrolled iterations (as two iterations are being unrolled, two respective 32-bit elements of the input W, W<31:0> and W<63:32> are used). As noted above with reference to FIG. 5, the outputs Y1'<31:0>, X1'<127:64> can be derived simply from X<127:0> by selecting the relevant bits from the input (when considering the rotations required by the SHA1 function), so the bit selection steps are not shown in FIG. 7, although bit selection logic would also be provided in the unrolled multi-iteration logic circuitry 52.

In FIG. 4, each of the two pipeline stages may include an instance of the logic circuitry shown in FIG. 7. Hence, although for convenience FIG. 7 uses the notation 0 and 1 to refer to the first and second iterations unrolled into one cycle, in the second pipeline stage of FIG. 4 the same logic would be used for processing iterations 2 and 3 of the SHA1 instruction. For the second pipeline stage, the input bits W<63:0> shown for iterations 0 and 1 would be replaced with W<127:64> to reflect that different elements of the input operand are selected for iterations 2 and 3 compared to iterations 0 and 1, and for iterations 2 and 3 the values X<127:0>, Y<31:0> shown in FIG. 7 would correspond to the values generated as X1'<127:0>, Y1'<31:0> at the output of the logic 52 for iterations 0 and 1.

As shown in FIG. 7, the unrolled multi-iteration logic circuitry 52 includes:

first-iteration hashing circuitry 70 to apply the given hashing function SHAhash (one of SHA_choose, SHA_majority, SHA_parity depending on which instruction variant is executed) to a first subset of bits X<127:32> selected from previous value of the working operand X supplied as input to the first iteration;

in parallel with the first-iteration hashing circuitry 70, second-iteration hashing circuitry 72 to apply the given hashing function SHAhash to a second subset of bits X<95:0> selected from the previous value of the working operand X that was supplied as an input to the first iteration. Note that the second subset of bits X<95:0> used by the second-iteration hashing circuitry 72 is shifted in position relative to the first subset of bits X<127:32> used by the first-iteration hashing circuitry 70, to account for the rotation by 32 bits imposed by the SHA1 round function between iterations. As shown in FIG. 5, in one iteration the SHA1 cryptographic hash function maps the second subset of bit positions <95:0> of X to the first subset of bit positions <127:32> of the updated value for X, and so by selecting bit positions X<95:0> as the input to the second-iteration hashing circuitry 72, the same result can be achieved as if iterations 0 and 1 were performed sequentially, even though the hash results $t_0$, $t_1$ are being calculated in parallel by circuitry 70, 72.

first-iteration rotation logic circuitry 73 rotates bits X<31: 0> by 5 bit positions to produce the rotated term ROL(X, 5) added in the $Y_{r0}$ addition for the first iteration. In practice, the rotation logic circuitry 73 does not require any arithmetic or shift operation as it can be implemented simply by connecting the appropriate bits of the working operand X to the corresponding bit positions in the first-iteration addition circuitry 74.

first-iteration addition circuitry 74 determines the addition result $Y_{r0}$ for the first iteration, which corresponds to bits X1<63:32> in the output of the second iteration. The first-iteration addition circuitry 74 comprises:

two stages 76, 77 of 3:2 carry-save adders to perform a 4:2 reduction of four terms:

Y<31:0>

X<26:0>:X<31:27> representing the 5-bit rotation of X<31:0> generated by the first-iteration rotation logic circuitry 73 the hash result to calculated by first-iteration hashing circuitry 70; and

W<31:0>, corresponding to element W[0] selected for the first iteration (as noted above, if the same logic is applied for the third iteration this would become W<95:63> corresponding to element W[2]).

Although the four terms could be added in any order, processing performance can be fastest by having the first stage 76 of 3:2 carry save addition add the Y, X, W terms which are independent of the hash applied to generate to, and then adding $t_0$ in the second stage 77, as this can allow the first stage 76 to start the addition before the hashing circuitry 70 has calculated $t_0$. The result of the second stage 77 represents the first iteration's addition result $Y_{r0}$ in a redundant representation $CS(Y_{r0})$, which in this example is as a carry-save representation comprising a carry term and a sum term, although other examples may use a different redundant representation such as signed digit representation. Carry-save adders are generally faster than carry-propagate adders, so this approach makes the redundant representation of $Y_{r0}$ available for processing in the second-iteration addition circuitry 80 at an earlier point within the cycle.

a carry-propagate adder 78 adds the two redundant terms of $CS(Y_{r0})$ to generate a non-redundant representation of $Y_{r0}$ which is output as X1'<63:32>. The value of the carry c26 out of bit position <26> is also determined in the carry-propagation addition and the carry value c26 is provided to the second-iteration addition circuitry 80 for consideration in the second iteration's addition.

an early 5-bit carry propagate adder 79 is provided which, although not needed for the first iteration's addition to form Yt0, is very helpful for speeding up the second iteration's addition. The early carry propagate adder 79 adds the upper 5 bits of the two redundant terms representing $CS(Y_{r0})$, to generate a non-redundant result representing the upper bits of $CS(Y_{r0})$, which after 5-bit left rotation can be added at the lower 5 bit positions in the second iteration's addition. By performing the 5-bit carry-propagate addition early (at an earlier point in the cycle than the full non-redundant result of $Y_{r0}$ is calculated by the main carry-propagate adder 78), this simplifies the handling of the cout carry shown in FIGS. 6A and 6B which is required relatively early in the second-iteration addition circuitry 80 (as it influences lower bits of the addition) and so for meeting timing requirements would be difficult to handle solely based on a value determined for cout by the main carry-propagate adder 78.

second-iteration rotation logic circuitry 81 generates the 5-bit left-rotated term to be added by the second-iteration addition circuitry 80. As for the first-iteration rotation logic circuitry 73, the second-iteration rotation logic circuitry 81 does not require any arithmetic or shift operation, as it can be implemented simply by connecting the appropriate bits of the output of the first-iteration addition circuitry 74 to the corresponding inputs in the second-iteration addition circuitry 80. As noted above, the rotated term for the second-iteration addition is represented partly in redundant representation and partly in non-redundant representation:

the lower 5 bits for the rotated term are the non-redundant output of 5 bits generated by the early carry-propagate adder 79 based on $CS(Y_{r0})<31:27>$;

the upper 27 bits for the rotated term are represented in a redundant representation using two separate terms, corresponding to the lower 27 bits of $CS(Y_{r0})<26:0>$ as output by the second stage 77 of carry-save adder in the first-iteration addition circuitry 74.

second-iteration addition circuitry 80 determines $Y_{r1}$, the result of the addition for the second iteration, which corresponds to bits X1'<31:0> in the updated value provided for X1' as the output of the second iteration. The second-iteration addition circuitry 80 comprises:

three-stages 82, 83, 84 of carry-save adder to provide a 5:2 reduction of the following terms (to produce 2 redundant terms representing the $Y_{r1}$ addition result):

X<127:96>, which, if the first and second iterations had been performed sequentially, would have been mapped to Y0'<31:0> in the first iteration so that it should become the Y input for the second iteration's addition the hash result $t_1$ calculated by second-iteration hashing circuitry 72; and W<63:32>, corresponding to element W[1] of the input operand selected for the second iteration (as noted above, if the same logic is applied for the third iteration this would become W<127:96> corresponding to element W[3]).

the rotated term generated by rotation logic circuitry 81, which is partially represented in redundant form using two separate terms for the upper 27 bits <31:5>—hence there are 5 terms in total for the addition of the upper 27 bits.

While these terms could be added in any order, the terms X<127:96>, W<63:32>, t1 are available sooner than the rotated term which depends on the first-iteration's addition, so it can be fastest for the first stage 82 of carry-save adder to add X<127:96>, W<63:32>, t1 to reduce these 3 terms to 2, which are then combined with the two redundant terms of the rotated term in two further stages of addition (each of those stages of 3:2 reduction adding in one of the two redundant terms—it does not matter which of the terms is added first). As shown in the inset diagram in FIG. 7, for the 5 least significant bits added in the second/third stage of CSA 83, one of stages 83 and 84 is redundant (since as represented by the o's in the 5 lsb positions, these bits are already represented non-redundantly based on the output of early 5-bit adder 79). Nevertheless, the two stages 83, 84 of 3:2 reduction are needed for calculating the upper 27 bits of $Y_{r1}$ based on the redundant terms representing the rotated term from second-iteration rotation circuitry 81.

Note that, in the final stage 84 of carry-stage addition, the lower 5 bits are replicated, generating two alternative results: one based on the actual value calculated by early 5-bit adder 79 as above, and a second based on assuming the corresponding bits are all 0—see subsequent discussion of carry adjustment.

carry-propagate adder 86 adds the 2 reduced terms from the final stage 84 of carry-save adder (subject to adjustment by the carry adjustment circuitry 90 as mentioned below), to generate a non-redundant representation of $Y_{r0}$ which becomes the output for X1'<31:0>. The c26 carry value from the $Y_{r0}$ addition by adder 78 is used as the carry in at bit position <0> for the $Y_{r1}$ performed by adder 86.

carry adjustment circuitry 90 adjusts the result of the second-iteration's addition based on analysis of the output of the 5-bit adder 79 and the c26 carry generated by the first-iteration's carry-propagate adder 78. The carry adjustment circuitry 90 comprises:

5-bit AND circuitry 91 to AND together each bit of the 5-bit non-redundant output of the early 5-bit carry-propagate adder 79. Hence, the output of AND circuitry 91 is true (1) if all of the bits of the 5-bit output of carry-propagate adder 79 are 1. This will happen if the bitwise XOR of the upper 5 bits of the redundant terms for $CS(Y_{r0})$ is 0b11111.

A further AND gate 92 combines, in a logical AND operation, the output of AND circuitry 91 with the c26 carry value generated by the first-iterations main carry-propagate adder 78. Therefore, the output of AND gate 92 is 1 only if both c26=1 AND the 5-bit result of 5-bit adder 79 is 0b11111 (and is 0 in all other scenarios). This detects the scenario in which c26=1 causes a carry to ripple up all the way to cout=1, due to the 5-bit add result being 0b11111 and so rolling over to 0b00000 when the c26 carry in is applied, thus requiring a correction to the second iteration's addition result.

Multiplexer 93 is provided at the output of the second iteration's final stage 84 of carry-save adder, to select:

if the output of AND gate 92 is 1: the alternative result of the replicated portion of the final 3:2 CSA 84 which is calculated based on substituting 0b00000 for the actual lower 5 bits of the rotated term output by rotation circuitry 81. This accounts for the fact that, now that c26 is known, it is determined that this would have caused 0b11111 in the result of the early adder 79 to increment to 0b00000 (if the carry had been available in time for the early adder 79), so that the output value of 0b11111 from early adder 79 should be ignored and replaced with 0b00000.

the main result from the final stage 84 of carry-save adder (which was based on adding the actual result of 5-bit adder 79 in a non-redundant representation to the other terms involved in the second iteration's $Y_{r1}$ addition). This represents the case in all scenarios where c26 carry would not have caused a ripple of a carry up to cout (either because c26 was 0 or because the upper bits of the redundant terms of $CS(Y_{r0})$ sum to a value other than 0b11111 so as to prevent the carry rippling up to cout), so that it is safe to inject cin=c26 at the lower end of the carry-propagate addition 86 because this will not cause a carry beyond bits <4:0>. Either way, this causes the cout carry chain to be broken as required in FIGS. 6A and 6B.

The 5-bit adder 79 is in parallel with the 3-to-2 CSA 83 for the second iteration, because the reduction by 3:2 CSA 83 is done only on the 27 most-significant bits; the 5 least-significant bits do not need to go through the reduction. Also, if timing is compromised for the use of carry c26 for controlling the selection by the selection multiplexer 93 before the $Y_{r1}$ 32-bit adder 86, the selection can be done instead after the $Y_{r1}$ 32-bit adder but, in this case, the adder 86 should be replicated as well to calculate redundantly the two alternative results.

Hence, with this approach, the rotated-term-independent part 82 of the second-iteration's addition can be performed before the rotated term is available from circuitry 81, which depends on part of the first-iteration's addition. By using the early carry-propagate adder 79 and the carry adjustment circuitry 90, the correct result can be obtained faster because it allows more parts of the second-iteration addition circuitry 80 to start earlier in the pipeline, in parallel with portions of the first iteration's addition circuitry 74 that are needed to calculate the c26 carry term. The carry adjustment circuitry 90 can account for the effects of the carries not known earlier, by adjusting the second iteration's addition result accordingly.

Hence, this approach allows two iterations of the SHA1 instruction to fit within a single processing cycle, enabling a great performance improvement (the SHA1 instruction can be executed in two cycles rather than four).

FIG. 8 illustrates a method for processing a cryptographic hash instruction. At step 300, the cryptographic hash instruction is decoded by the instruction decoding circuitry 10. The instruction specifies at least one working operand (e.g. X, Y) and an input operand (e.g. W). At step 302, in response to decoding of the cryptographic hash instruction, processing circuitry 22 (in particular, the unrolled multi-iteration logic circuitry 52) performs multiple iterations of a cryptographic hash function, where each iteration determines an updated value (e.g. X', Y') for the at least one working operand based on a previous value (X, Y) for the at least one working operand and a respective portion W[e] of the input operand W selected for that iteration. At least two iterations are processed per processing cycle.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 9:
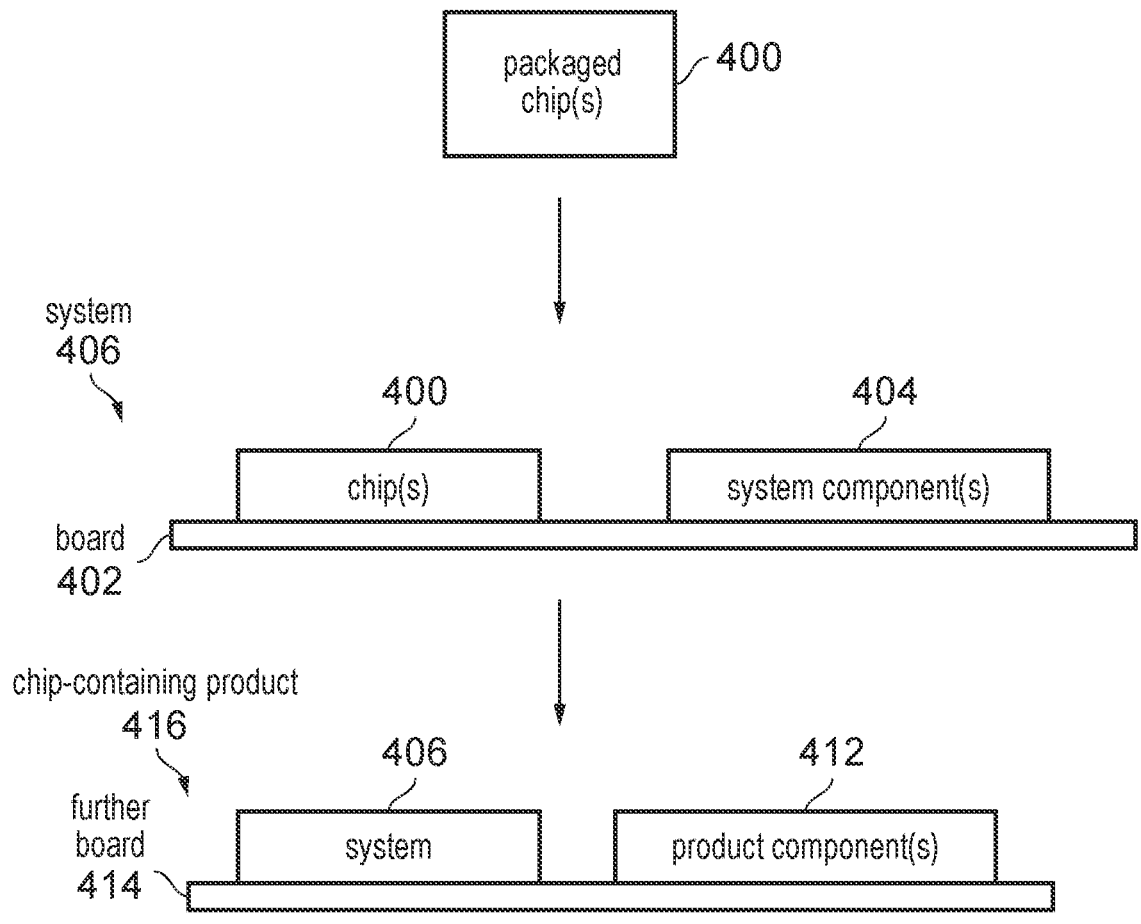
FIG. 9 illustrates a system and a chip-containing product.

As shown in FIG. 9, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/ or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   instruction decoding circuitry to decode a cryptographic hash instruction specifying at least one working operand and an input operand; and
   processing circuitry to perform, in response to decoding of the cryptographic hash instruction, a plurality of iterations of a cryptographic hash function, each iteration of the cryptographic hash function comprising determining an updated value for the at least one working operand based on a previous value for the at least one working operand and a respective portion of the input operand selected to be processed in that iteration, the updated value for the at least one working operand in one iteration becoming the previous value for the at least one working operand in a next iteration; in which:
   in response to decoding of the cryptographic hash instruction, the processing circuitry is configured to perform at least two iterations of the cryptographic hash function per processing cycle.

2. The apparatus according to clause 1, in which the cryptographic hash function comprises at least a portion of one round of SHA-1.

3. The apparatus according to any of clauses 1 and 2, in which the processing circuitry is configured to perform two iterations of the cryptographic hash function per processing cycle.

4. The apparatus according to any of clauses 1 to 3, in which the processing circuitry comprises unrolled multi-iteration logic circuitry disposed between two successive stages of clocked registers, where the unrolled multi-iteration logic circuitry is configured to process the at least one working operand read from a first of the successive sets of clocked registers as an input to a first iteration of the plurality of iterations to generate an updated value for the at least one working operand written to a second of the successive sets of clocked registers as an output of a later iteration than the first iteration.

5. The apparatus according to any of clauses 1 to 4, in which the processing circuitry comprises a cryptographic hash instruction processing pipeline comprising a plurality of pipeline stages, each pipeline stage to perform at least two of the iterations of the cryptographic hash function per processing cycle.

6. The apparatus according to any of clauses 1 to 5, in which:

the plurality of iterations of the cryptographic hash function performed in response to the cryptographic hash instruction comprise a first iteration and a second iteration to be performed in a same processing cycle; and the processing circuitry is configured to perform a first computation for the first iteration in parallel with a second computation for the second iteration.

7. The apparatus according to clause 6, in which:

the cryptographic hash function comprises applying a given hashing function to a subset of bit positions of the previous value for the at least one working operand, to generate a term used to generate a portion of the updated value for the at least one working operand;

the first computation comprises applying the given hashing function to a first subset of bit positions of the first iteration's version of the previous value for the at least one working operand; and the second computation comprises applying the given hashing function to a second subset of bit positions of the first iteration's version of the previous value for the at least one working operand, where the second subset is different to the first subset.

8. The apparatus according to clause 7, in which the cryptographic hash function comprises mapping the second subset of bit positions of the previous value for the at least one working operand to the first subset of bit positions within the updated value for the at least one working operand.

9. The apparatus according to any of clauses 7 and 8, in which the instruction decoder is configured to support a plurality of variants of the cryptographic hash instruction corresponding to different hashing functions used as the given hashing function.

10. The apparatus according to any of clauses 1 to 9, in which, in the cryptographic hash function, a portion of the updated value for the at least one working operand depends on an addition of a plurality of terms, the plurality of terms including the respective portion of the input operand and one or more further terms derived from the previous value of the at least one working operand; and the plurality of iterations of the cryptographic hash function performed in response to the cryptographic hash instruction comprise a first iteration and a second iteration to be performed in a same processing cycle.

11. The apparatus according to clause 10, in which the processing circuitry is configured to perform a part of the addition for the first iteration in parallel with a part of the addition for the second iteration.

12. The apparatus according to any of clauses 10 and 11, in which, in the cryptographic hash function:

the plurality of terms for the addition comprise a rotated term which depends on a rotated version of bits from a selected subset of bit positions within the previous value for the at least one working operand; and the selected subset of bit positions correspond to bit positions in the updated value for the at least one working operand which depend on a result of the addition of the plurality of terms.

13. The apparatus according to clause 12, in which the processing circuitry comprises second-iteration addition circuitry to perform a rotated-term-dependent part of the addition for the second iteration based on at least two separate values representing, in a redundant representation, at least a portion of the rotated term for the addition for the second iteration.

14. The apparatus according to clause 13, in which the second-iteration addition circuitry is configured to commence performing the rotated-term-dependent part of the addition based on the at least two separate values before a non-redundant representation of the result for the addition for the first iteration is available; and the processing circuitry comprises carry adjustment circuitry to adjust a result of the addition for the second iteration dependent on whether generation of the non-redundant representation of the addition for the first iteration causes a carry out to propagate beyond a bit position corresponding to a most significant bit in the rotated term used for the addition in the second iteration.

15. The apparatus according to any of clauses 13 and 14, in which:

the processing circuitry comprises early carry-propagate addition circuitry to generate, in a non-redundant representation, a plurality of most significant bits for a result of the addition for the first iteration, the early carry-propagate addition circuitry being configured to generate the plurality of most significant bits at an earlier timing than a timing at which a non-redundant representation of remaining less significant bits of the result of the addition for the first iteration is generated; and in the rotated-term-dependent part of the addition for the second iteration, a least significant portion of the rotated term is represented in the non-redundant representation based on the most significant bits generated by the early carry-propagate addition circuitry.

16. The apparatus according to clause 15, comprising carry adjustment circuitry to selectively adjust a portion of the result of the addition for the second iteration depending on a carry out value determined when generating the non-redundant representation of the remaining less significant bits of the result of the addition for the first iteration.

17. A system comprising:

the apparatus of any of clauses 1 to 16, implemented in at least one packaged chip;

at least one system component; and a board, wherein the at least one packaged chip and the at least one system component are assembled on the board.

18. A chip-containing product comprising the system of clause 17 assembled on a further board with at least one other product component.

19. Computer-readable code for fabrication of an apparatus comprising:

instruction decoding circuitry to decode a cryptographic hash instruction specifying at least one working operand and an input operand; and processing circuitry to perform, in response to decoding of the cryptographic hash instruction, a plurality of iterations of a cryptographic hash function, each iteration of the cryptographic hash function comprising determining an updated value for the at least one working operand based on a previous value for the at least one working operand and a respective portion of the input operand selected to be processed in that iteration, the updated value for the at least one working operand in one iteration becoming the previous value for the at least one working operand in a next iteration; in which:

in response to decoding of the cryptographic hash instruction, the processing circuitry is configured to perform at least two iterations of the cryptographic hash function per processing cycle.

20. A computer-readable storage medium storing the computer-readable code of clause 19.

21. A method comprising:

decoding a cryptographic hash instruction specifying at least one working operand and an input operand; and performing, in response to decoding of the cryptographic hash instruction, a plurality of iterations of a cryptographic hash function, each iteration of the cryptographic hash function comprising determining an updated value for the at least one working operand based on a previous value for the at least one working operand and a respective portion of the input operand selected to be processed in that iteration, the updated value for the at least one working operand in one iteration becoming the previous value for the at least one working operand in a next iteration; in which:

in response to decoding of the cryptographic hash instruction, processing circuitry performs at least two iterations of the cryptographic hash function per processing cycle.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

instruction decoding circuitry configured to decode a cryptographic hash instruction specifying at least one working operand and an input operand; and processing circuitry configured to perform, in response to decoding of the cryptographic hash instruction, a plurality of iterations of a cryptographic hash function, each iteration of the cryptographic hash function comprising determining an updated value for the at least one working operand based on a previous value for the at least one working operand and a respective portion of the input operand selected to be processed in that iteration, the updated value for the at least one working operand in one iteration becoming the previous value for the at least one working operand in a next iteration; in which:

in response to decoding of the cryptographic hash instruction, the processing circuitry is configured to perform at least two iterations of the cryptographic hash function per processing cycle.

2. The apparatus according to claim 1, in which the cryptographic hash function comprises at least a portion of one round of SHA-1.

3. The apparatus according to claim 1, in which the processing circuitry is configured to perform two iterations of the cryptographic hash function per processing cycle.

4. The apparatus according to claim 1, in which the processing circuitry comprises unrolled multi-iteration logic circuitry disposed between two successive stages of clocked registers, where the unrolled multi-iteration logic circuitry is configured to process the at least one working operand read from a first of the successive sets of clocked registers as an input to a first iteration of the plurality of iterations to generate an updated value for the at least one working operand written to a second of the successive sets of clocked registers as an output of a later iteration than the first iteration.

5. The apparatus according to claim 1, in which the processing circuitry comprises a cryptographic hash instruction processing pipeline comprising a plurality of pipeline stages, each pipeline stage configured to perform at least two of the iterations of the cryptographic hash function per processing cycle.

6. The apparatus according to claim 1, in which:

the plurality of iterations of the cryptographic hash function performed in response to the cryptographic hash instruction comprise a first iteration and a second iteration to be performed in a same processing cycle; and the processing circuitry is configured to perform a first computation for the first iteration in parallel with a second computation for the second iteration.

7. The apparatus according to claim 6, in which:

the cryptographic hash function comprises applying a given hashing function to a subset of bit positions of the previous value for the at least one working operand, to generate a term used to generate a portion of the updated value for the at least one working operand;

the first computation comprises applying the given hashing function to a first subset of bit positions of the first iteration's version of the previous value for the at least one working operand; and the second computation comprises applying the given hashing function to a second subset of bit positions of the first iteration's version of the previous value for the at least one working operand, where the second subset is different to the first subset.

8. The apparatus according to claim 7, in which the cryptographic hash function comprises mapping the second subset of bit positions of the previous value for the at least one working operand to the first subset of bit positions within the updated value for the at least one working operand.

9. The apparatus according to claim 7, in which the instruction decoder is configured to support a plurality of variants of the cryptographic hash instruction corresponding to different hashing functions used as the given hashing function.

10. The apparatus according to claim 1, in which, in the cryptographic hash function, a portion of the updated value for the at least one working operand depends on an addition of a plurality of terms, the plurality of terms including the respective portion of the input operand and one or more further terms derived from the previous value of the at least one working operand; and the plurality of iterations of the cryptographic hash function performed in response to the cryptographic hash instruction comprise a first iteration and a second iteration to be performed in a same processing cycle.

11. The apparatus according to claim 10, in which the processing circuitry is configured to perform a part of the addition for the first iteration in parallel with a part of the addition for the second iteration.

12. The apparatus according to claim 10, in which, in the cryptographic hash function:

the plurality of terms for the addition comprise a rotated term which depends on a rotated version of bits from a selected subset of bit positions within the previous value for the at least one working operand; and the selected subset of bit positions correspond to bit positions in the updated value for the at least one working operand which depend on a result of the addition of the plurality of terms.

13. The apparatus according to claim 12, in which the processing circuitry comprises second-iteration addition circuitry to perform a rotated-term-dependent part of the addition for the second iteration based on at least two separate values representing, in a redundant representation, at least a portion of the rotated term for the addition for the second iteration.

14. The apparatus according to claim 13, in which the second-iteration addition circuitry is configured to commence performing the rotated-term-dependent part of the addition based on the at least two separate values before a non-redundant representation of the result for the addition for the first iteration is available; and the processing circuitry comprises carry adjustment circuitry to adjust a result of the addition for the second iteration dependent on whether generation of the non-redundant representation of the addition for the first iteration causes a carry out to propagate beyond a bit position corresponding to a most significant bit in the rotated term used for the addition in the second iteration.

15. The apparatus according to claim 13, in which:

the processing circuitry comprises early carry-propagate addition circuitry configured to generate, in a non-redundant representation, a plurality of most significant bits for a result of the addition for the first iteration, the early carry-propagate addition circuitry being configured to generate the plurality of most significant bits at an earlier timing than a timing at which a non-redundant representation of remaining less significant bits of the result of the addition for the first iteration is generated; and in the rotated-term-dependent part of the addition for the second iteration, a least significant portion of the rotated term is represented in the non-redundant representation based on the most significant bits generated by the early carry-propagate addition circuitry.

16. The apparatus according to claim 15, comprising carry adjustment circuitry configured to selectively adjust a portion of the result of the addition for the second iteration depending on a carry out value determined when generating the non-redundant representation of the remaining less significant bits of the result of the addition for the first iteration.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17 assembled on a further board with at least one other product component.

19. A non-transitory computer-readable medium to store computer-readable code for fabrication of an apparatus comprising:

instruction decoding circuitry to decode a cryptographic hash instruction specifying at least one working operand and an input operand; and processing circuitry to perform, in response to decoding of the cryptographic hash instruction, a plurality of iterations of a cryptographic hash function, each iteration of the cryptographic hash function comprising determining an updated value for the at least one working operand based on a previous value for the at least one working operand and a respective portion of the input operand selected to be processed in that iteration, the updated value for the at least one working operand in one iteration becoming the previous value for the at least one working operand in a next iteration; in which:

in response to decoding of the cryptographic hash instruction, the processing circuitry is configured to perform at least two iterations of the cryptographic hash function per processing cycle.

20. A method comprising:

decoding a cryptographic hash instruction specifying at least one working operand and an input operand; and performing, in response to decoding of the cryptographic hash instruction, a plurality of iterations of a cryptographic hash function, each iteration of the cryptographic hash function comprising determining an updated value for the at least one working operand based on a previous value for the at least one working operand and a respective portion of the input operand selected to be processed in that iteration, the updated value for the at least one working operand in one iteration becoming the previous value for the at least one working operand in a next iteration; in which:

in response to decoding of the cryptographic hash instruction, processing circuitry performs at least two iterations of the cryptographic hash function per processing cycle.

* * * * *